(12) United States Patent  
Nicolia et al.

(10) Patent No.: US 6,739,597 B2  
(45) Date of Patent: May 25, 2004

(54) DRAIN GASKET

(75) Inventors: Carl R. Nicolia, Erie, PA (US); Chris Majocka, Erie, PA (US); William Verdecchia, Erie, PA (US)

(73) Assignee: Zurn Industries, Inc., Erie, PA (US)

( * ) Notice: Subject to any disclaimer, the term of this patent is extended or adjusted under 35 U.S.C. 154(b) by 0 days.

(21) Appl. No.: 09/993,306

(22) Filed: Nov. 16, 2001

(65) Prior Publication Data

US 2002/0079652 A1 Jun. 27, 2002

Related U.S. Application Data

(60) Provisional application No. 60/253,762, filed on Nov. 29, 2000.

(51) Int. Cl.[7] .............................................. F16J 15/10
(52) U.S. Cl. ...................... 277/609; 277/602; 277/608
(58) Field of Search ................................. 277/602, 607, 277/608, 615, 628, 609

(56) References Cited

U.S. PATENT DOCUMENTS

| | | | |
|---|---|---|---|
| 2,596,182 A | 5/1952 | Sosaya | |
| 2,985,291 A | 5/1961 | Schoepe et al. | |
| 3,179,446 A | 4/1965 | Paterson | |
| 3,198,323 A | 8/1965 | Alberti et al. | |
| 3,654,965 A | 4/1972 | Gramain | |
| 4,243,251 A | 1/1981 | Lindquist | |
| 4,553,559 A | 11/1985 | Short, III | |
| 4,602,504 A * | 7/1986 | Barber | 73/49.8 |
| 4,607,664 A | 8/1986 | Carney et al. | |
| 4,630,630 A | 12/1986 | Reynolds et al. | |
| 4,706,482 A | 11/1987 | Barber | |
| 4,746,023 A | 5/1988 | Belter | |
| 4,902,043 A | 2/1990 | Zillig et al. | |
| RE33,199 E | 4/1990 | Karr, Jr. | |
| 4,936,350 A * | 6/1990 | Huber | 138/90 |
| 5,286,040 A * | 2/1994 | Gavin | 277/606 |
| 5,377,361 A * | 1/1995 | Piskula | 4/252.4 |
| 5,507,501 A * | 4/1996 | Palmer | 277/602 |
| 5,624,123 A | 4/1997 | Meyers | |
| 5,711,536 A * | 1/1998 | Meyers | 277/606 |
| 5,882,014 A * | 3/1999 | Gavin | 277/602 |
| 5,938,061 A * | 8/1999 | Ward et al. | 220/242 |
| 5,954,345 A * | 9/1999 | Svoboda et al. | 277/626 |
| 5,996,134 A * | 12/1999 | Senninger | 4/252.4 |
| 6,029,981 A | 2/2000 | Hawley et al. | |
| 6,209,584 B1 * | 4/2001 | Huber | 138/89 |

* cited by examiner

Primary Examiner—Anthony Knight  
Assistant Examiner—Michael J. Kyle  
(74) Attorney, Agent, or Firm—Webb Ziesenhiem Logsdon Orkin & Hanson, P.C.

(57) ABSTRACT

A seal for a drain that includes a seal body having an annular portion and an integral disk portion. An outer sealing surface and inner sealing surface are defined on the annular portion. A handle extends from a first surface of the disk portion. The disk portion defines at least one scribe line adapted to facilitate removal of the disk portion from the annular portion when a pulling force is applied to the handle.

10 Claims, 5 Drawing Sheets

DRAIN GASKET

CROSS-REFERENCE TO RELATED APPLICATION

This application claims the benefit of U.S. Provisional Application Serial No. 60/253,762 filed Nov. 29, 2000.

BACKGROUND OF THE INVENTION

Field of the Invention

The present invention relates to gaskets and, more particularly, to gaskets for use in floor drains.

Floor drains are installed in most basements of building constructions. In most drainage systems, floor drain pipes are run to an elevation below the expected finished basement floor level so that the upper surface of the drain will be flush with or slightly below the finished floor. In new construction, the drainage system is first plumbed and then pressure tested for leaks. A prior art floor drain, commercially available under the name JONESPEC®, includes an integral test cap to assist in pressure testing.

More specifically, referring to FIGS. 1a, 1b, and 2 show a prior art floor drain and/or closet drain 10, such as the Zurn Model Z-415, which includes a strainer 12 attached to an adjustable head 14 which is secured to a finished floor 16. The finished floor 16 is spaced a distance away from a waterproof membrane 18 which rests on a rough floor slab 20. Typically, the rough floor slab 20 is made of concrete. A collar 22 is attached via fasteners 24 to a cast iron drain body 26. The cast iron drain body 26 is embedded in the concrete forming the rough floor slab 20. As shown in FIG. 1b, a prior art seal 30 without a test cap is secured to the drain body 26 and receives a pipe 28. FIG. 2 shows a prior art seal 32 having a test cap 38 secured to the drain body 26 for receiving a pipe 28. Typically, the pipe 28 is made of cast iron or plastic. A retainer 34 (shown in FIG. 2) is secured to a first portion of the prior art seal 32 to hold it in place and is likewise embedded in the concrete that forms the rough floor slab 20.

Referring to FIG. 2, the prior art seal 32 includes an integral seal body 36 having a disk portion 38 (test cap) attached to an annular portion 40. The annular portion 40 of the seal body 36 defines an outer sealing surface 42 and an inner sealing surface 44 wherein each surface has a plurality of ribs 46. The annular portion 40 defines a seal between the pipe 28 and the drain body 26 and the retainer 34.

In operation, FIGS. 2, 3a, and 3b show the prior art seal 32 installed in a drainage system. The system is then pressurized with either water or air to test for leakage. If no leaks are identified, then the disk portion 38 is cut using a knife so that a passageway 48 (shown in FIG. 3b) is defined in the drain 10.

Although the prior art seal 32 works well, there are problems when removing the disk portion 38. First, cutting the disk portion 38 can result in an uneven surface pattern. In some instances, tearing of the disk portion 38 may result in uneven edges which may affect the performance of the drain 10.

Therefore, it is an object of the present invention to overcome the above-mentioned problems.

SUMMARY OF THE INVENTION

The present invention is a drain gasket or seal for use with a drain that includes a seal body having an annular portion, a mounting flange, and a disk portion. The annular portion defines an outer sealing surface and inner sealing surface. A plurality of ribs defining a portion of the outer sealing surface and a portion of the inner sealing surface provides a fluid seal. The mounting flange is integrally attached to a first end of the annular portion. The disk portion, having a first surface and a second surface, is integrally attached to a second end of the annular portion. The inner sealing surface of the annular portion and the second surface of the disk portion define a cavity. A handle extends from the first surface of the disk portion in a direction opposite the cavity. Preferably, the handle and disk portion are integrally formed. The disk portion also defines at least one scribe line adapted to facilitate removal of the disk portion from the annular portion when a pulling force is applied to the handle in a direction opposite the cavity. The scribe line is defined by a recess in the disk portion which facilitates the tearing of the disk portion when the handle is pulled. Preferably, a plurality of scribe lines are defined on the disk portion so that an outer rim portion and an inner ring portion are defined on the disk portion wherein the handle is defined. In this manner, when the handle is pulled in a direction opposite the cavity, the disk portion tears about the outer rim portion to facilitate removal of the disk portion. Preferably, the first surface of the disk portion includes only one circular scribe line while the second surface of the disk portion defines two circular scribe lines.

A method of installing a seal in a drain includes the steps of (i) providing a seal made in accordance with the present invention; (ii) inserting the seal into a drain body wherein the handle on the disk portion extends in a first direction; (iii) inserting a pipe into the cavity of the seal body; (iv) pressurizing the cavity to test for leaks; and (v) pulling the handle in a direction opposite the cavity until the disk portion separates from the annular portion of the body along the scribe line. Preferably, a slit is cut in the scribe line of the disk portion before the handle is pulled in order to help facilitate removal of the disk portion.

BRIEF DESCRIPTION OF THE DRAWINGS

FIG. 7b is a front elevational view of a section of the seal taken along lines VIIb—VIIb of FIG. 7a;

FIG. 7c is a bottom plan view of the seal of FIG. 7a;

DETAILED DESCRIPTION OF THE PREFERRED EMBODIMENTS

Figure 4:
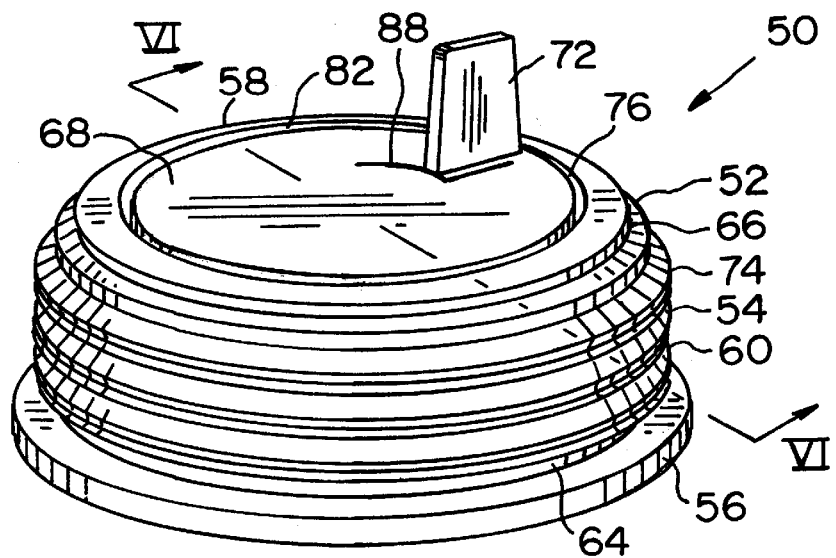
FIG. 4 is a perspective view of a seal made in accordance with the present invention.
Figure 5:
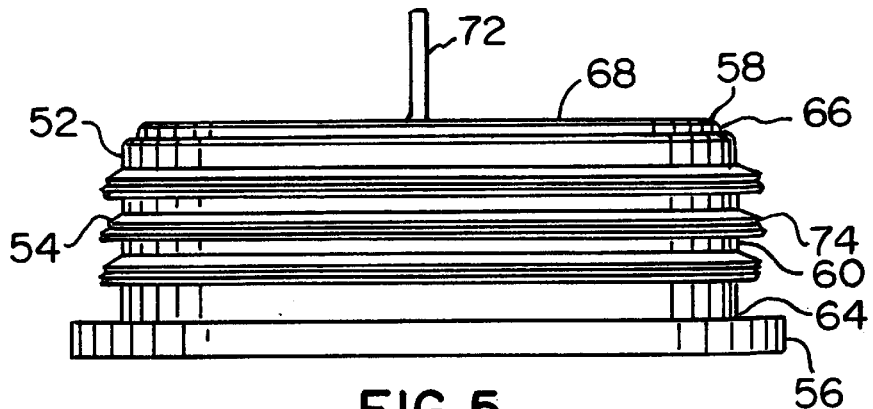
FIG. 5 is a front elevational view of the seal of FIG. 4.
Figure 6:
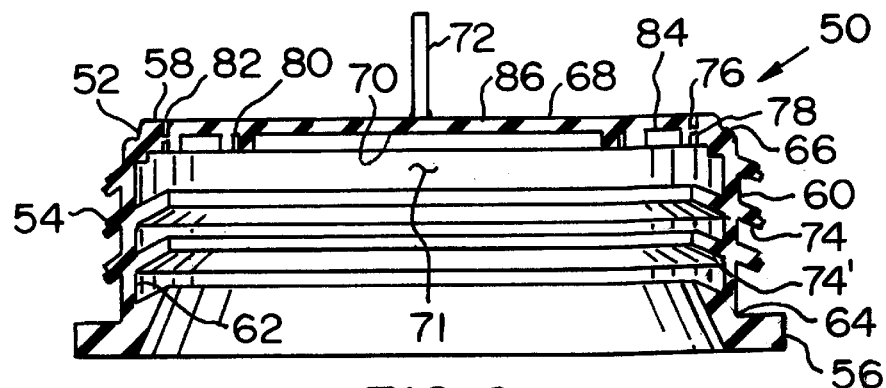
FIG. 6 is a section of the seal taken along lines VI—VI of FIG. 4.
Figure 7A:
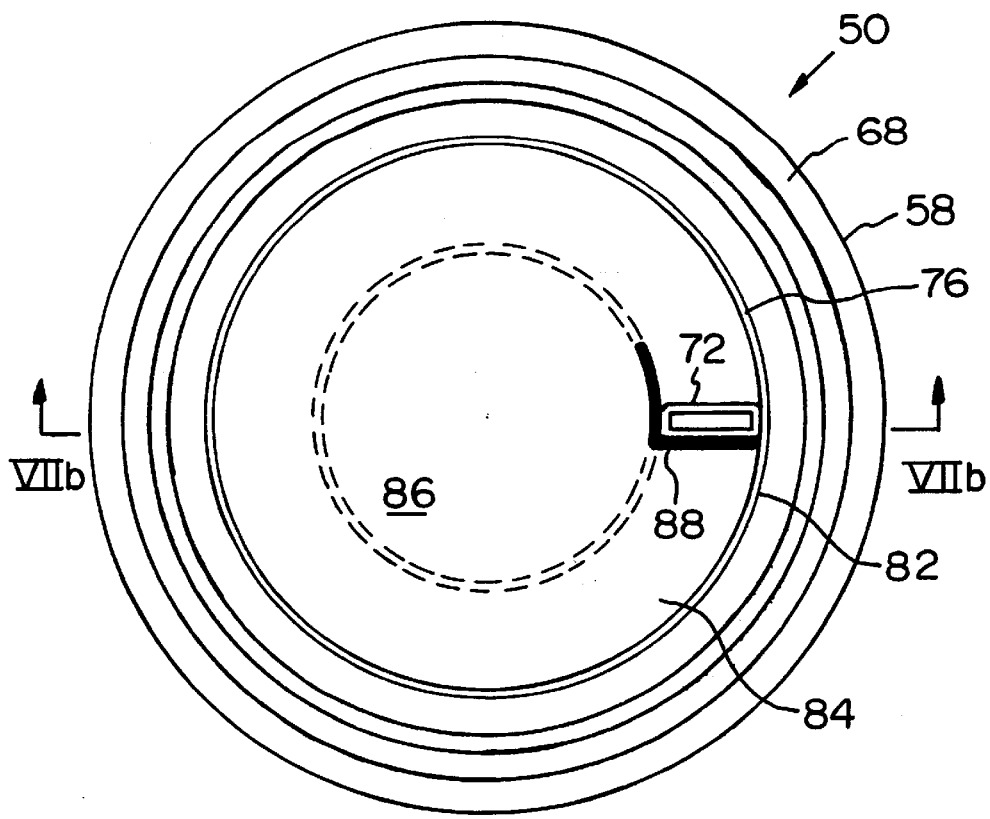
FIG. 7a is a top plan view of the seal of FIG. 4.
Figure 7C:
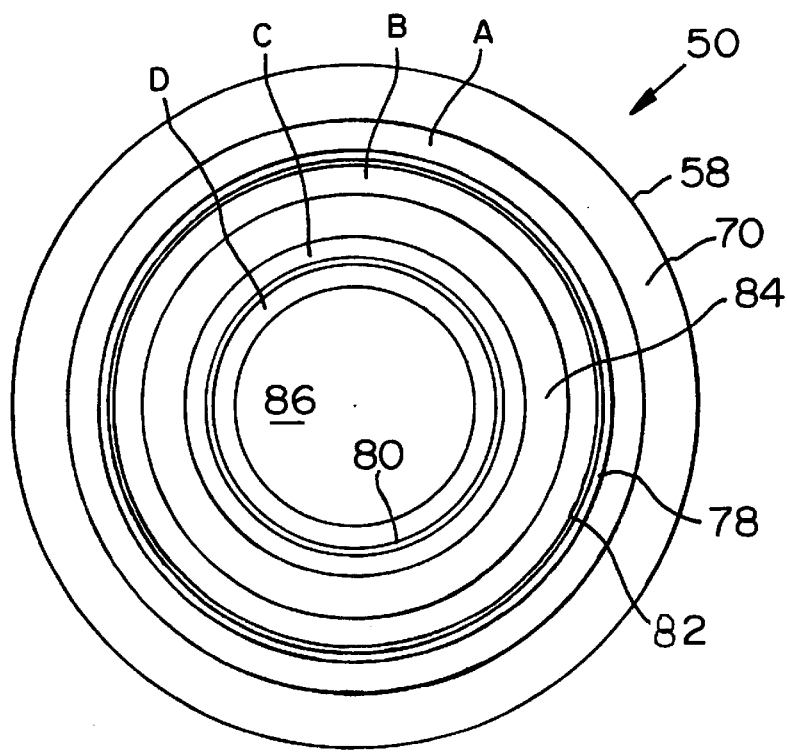
Figure 7D:
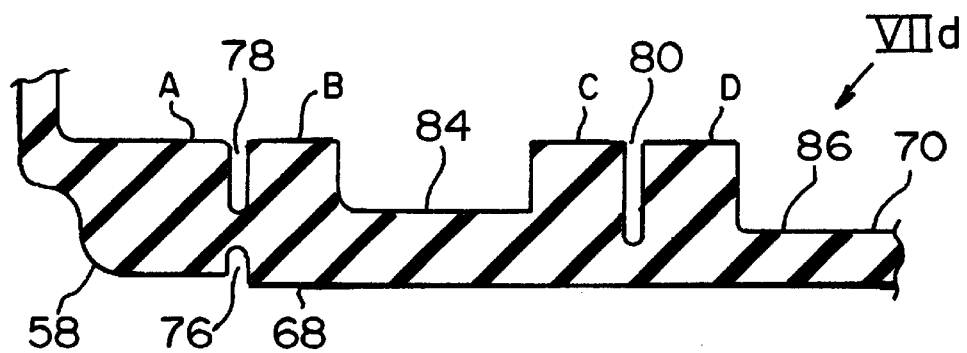
FIG. 7d is a view of a section of a portion of the seal shown identified as VIId in FIG. 7b.

Referring to FIGS. 4, 5, and 6, a drain gasket or seal 50 made in accordance with the present invention includes an integral seal body 52 having an annular portion 54, a mounting flange 56, and a disk portion 58. The body 52 can be made of a material, such as an elastomeric material, a polymeric material, or a flexible rubber material. The annular portion 54, having a first end 64 and a second end 66, defines an outer sealing surface 60 and an inner sealing surface 62. The mounting flange 56 is integrally attached to the first end 64 of the annular portion 54. The disk portion 58, having a first surface 68 and a second surface 70, is integrally attached to the second end 66 of the annular portion 54. The inner sealing surface 62 of the annular portion 54 and the second surface 70 of the disk portion 58 define a cavity 71. A handle 72, integrally formed with the disk portion 58, extends from the first surface 68 of the disk portion 58 in a direction opposite the cavity 71.

The seal 50 can include at least one rib 74 extending from the outer sealing surface 60 of the annular portion 54 in a direction opposite the cavity 71, wherein the rib 74 defines a portion of the outer sealing surface 60. Also, the seal 50 can further include at least one rib 74' extending from the inner sealing surface 62 of the annular portion 54 in a direction toward the cavity 71, wherein the rib 74' defines a portion of the inner sealing surface 62. Preferably, a plurality of ribs 74, 74' (shown in FIG. 6) defines a portion of the outer sealing surface 60 and a portion of the inner sealing surface 62 of the annular portion 54.

Referring to FIGS. 7a–7d, a plurality of scribe lines 76, 78 and 80 is defined on respective first surface 68 and second surface 70 of the disk portion 58. The first scribe line 76 defined on the first surface 68 and the second scribe line 78 defined on the second surface 70 are circular shaped and define an outer rim portion 82 on which the handle 72 is defined. As can be seen in FIG. 6, the first scribe line 76 is coaxial with and axially spaced directly above the second scribe line 78. The third scribe line 80 defined on the second surface 70 of the disk portion 58 further defines an inner disk portion 86. Annular shaped rings A, B, C and D are used to define the circular scribe lines 76, 78 and 80, which are thicker than the remaining portion of the disk portion and which are adapted to facilitate removal of the disk portion 58 from the annular portion 54 when a pulling force is applied to the handle 72.

Figure 1A:
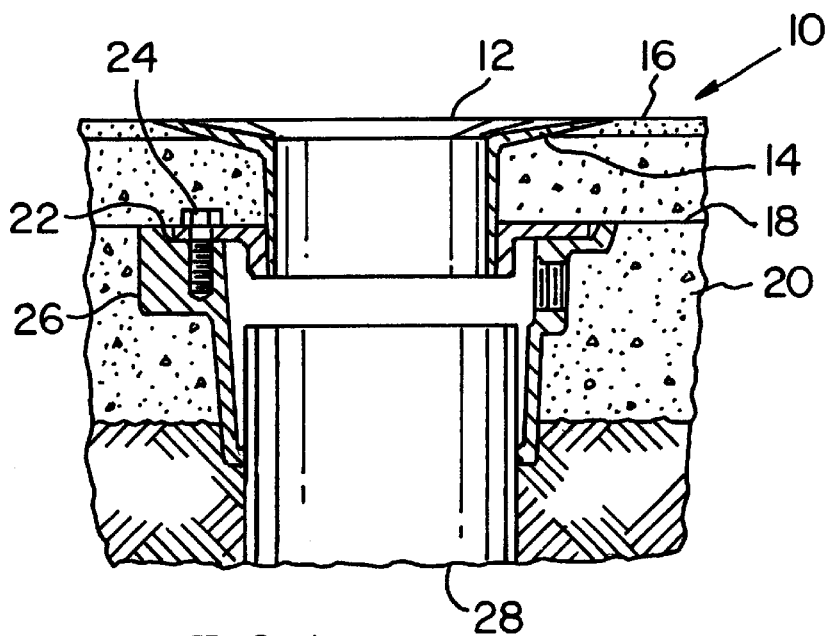
FIG. 1a is an elevational view, partially in section, of a floor drain installation made in accordance with the prior art.
Figure 1B:
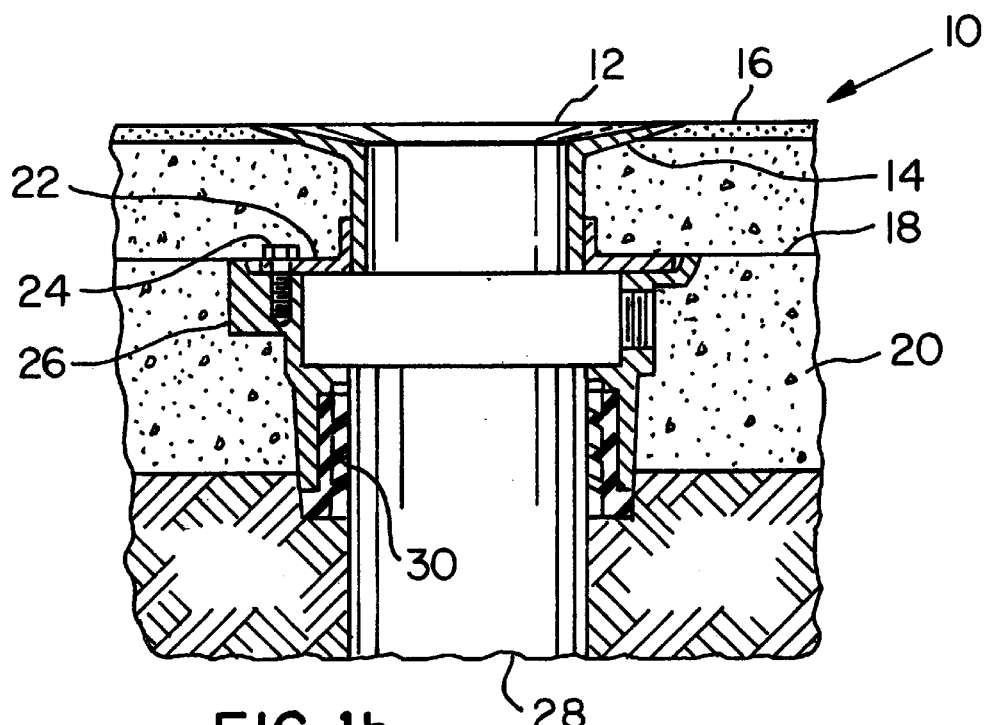
FIG. 1b is an elevational view, partially in section, of a second floor drain installation made in accordance with the prior art.
Figure 2:
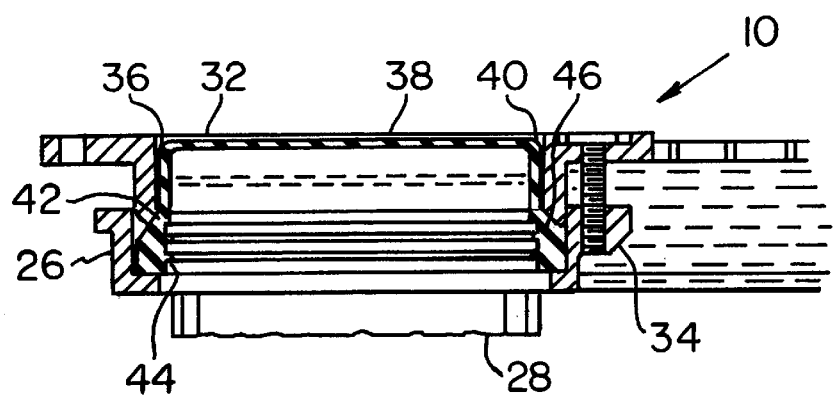
FIG. 2 is an elevational view, in section, of an installation of a prior art seal with an integral test cap in a drainage system.
Figure 3A:
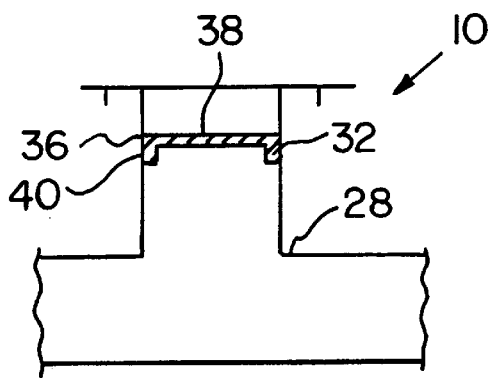
FIG. 3a is a partial sectional view of a drainage system having a prior art seal with a test cap installed therein.
Figure 3B:
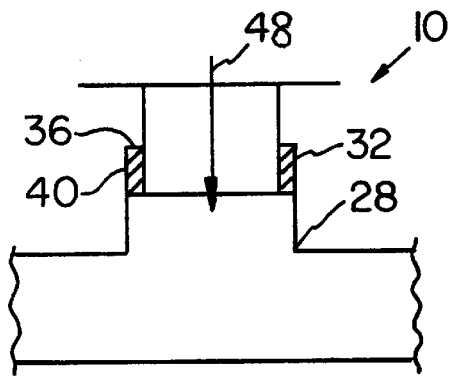
FIG. 3b is the partial sectional view of the drainage system of FIG. 3a with the test cap removed.
Figure 7B:
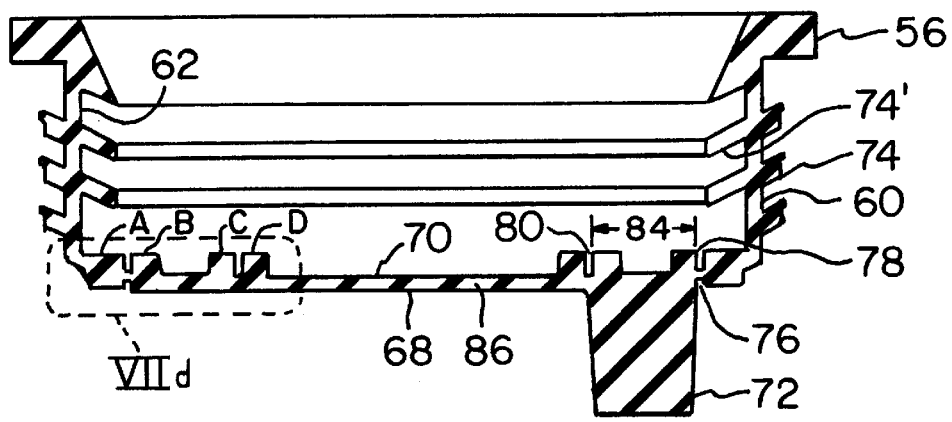
Figure 8:
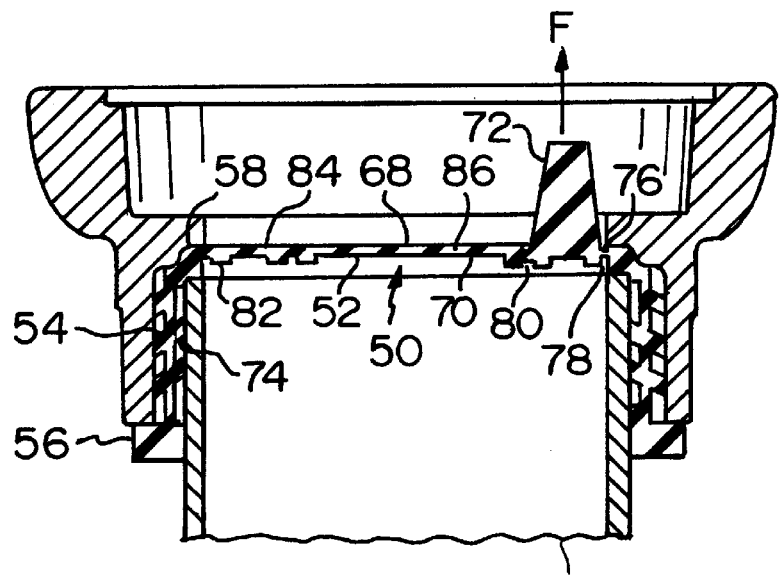
FIG. 8 is a sectional elevational view of a seal made in accordance with the present invention installed in a drainage system.

In operation, the seal 50 is installed in a similar manner shown in FIG. 2, replacing the prior art seal 32 (see FIG. 8). The method of installing the seal 50 in a drain 10 includes the steps of inserting the seal 50 into a drain body 26, wherein the handle 72 on the disk portion 58 extends in a first direction. Next, a pipe 28 is inserted into the cavity 71 of the seal body 52. The cavity 71 is then pressurized to test for leaks. After the drain 10 is successfully pressure tested, the handle 72 is pulled outwardly in direction F, shown in FIG. 8, so that the outer rim portion 82 tears about the periphery of the disk portion 58 via along scribe lines 76, 78. The handle 72 is continued to be pulled until the outer rim portion 82 completely separates from the annular portion 54. Also, the inner disk portion 86 partially separates from the inner ring portion 84 during the pulling of the handle 72 but is partially attached to the inner ring portion 84 when the inner ring portion 84 is completely separated from the annular portion 54. The separated disk portion 58, which includes the inner disk portion 86 and the inner ring portion 84, can then be disposed of and the drain system is operational.

To facilitate the removal of the disk portion 58 from the annular portion 54, a slit, via a knife or sharp object, should be cut on at least a portion of the first scribe line 76, but preferably on portions of all of the scribe lines 76, 78, and 80, whereby the knife or sharp object passes completely through the disk portion 58 prior to pulling the handle 72, causing the remainder of the disk portion 58 to tear along the outer rim portion 82. In a preferred slit arrangement, a first slit is cut along line or indicia 88 (shown in FIG. 7a) which contains a portion of the third scribe line 80 and which a portion is cut adjacent the handle 72 to facilitate removal of the disk portion 58 from the annular portion 54. In operation, the present invention permits easy removal of the disk portion 58, without the possibility of jagged edges on the annular portion 54, as could have occurred with the prior art seal 32 or drain gasket.

Figure 9:
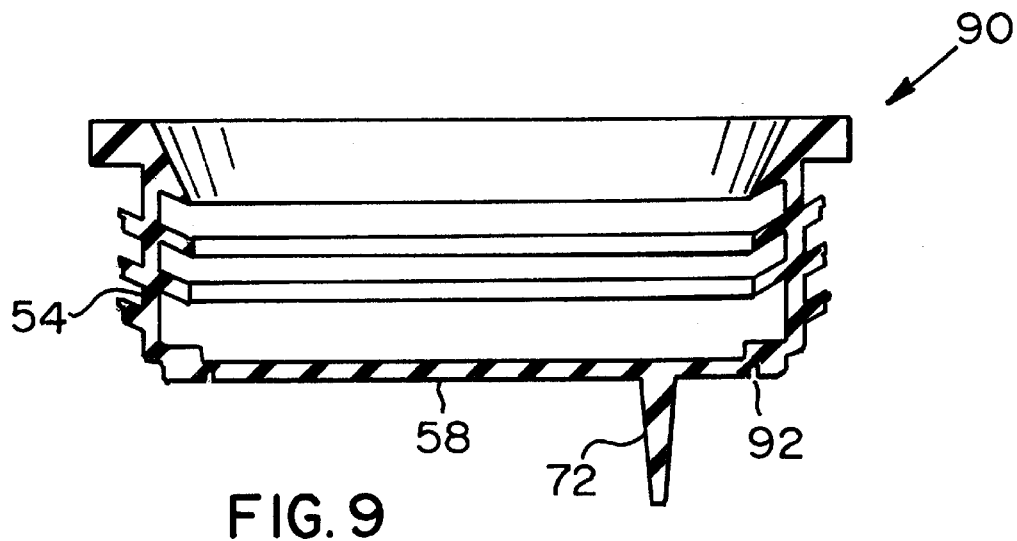
FIG. 9 is a sectional elevational view showing a second embodiment of a seal made in accordance with the present invention.

FIG. 9 shows a second embodiment of a drain gasket or seal 90 made in accordance with the present invention, which is similar to the seal 50, except for the below-noted differences. In this arrangement, only one circular scribe line 92 is provided. In this manner, removal is accomplished by cutting a slit in a portion of the circular scribe line 92 and pulling on the handle 72 until the disk portion 58 separates from the annular portion 54. However, it is noted that removal of the disk portion 58 from seal 50 is easier than removal of the disk portion 58 from seal 90.

The drain gaskets or seals 50 and 90 are unitary structures made of an elastomeric material, polymeric material, or rubber material, that is flexible. The seals of the present invention can be used in connection with many types of plumbing drainage systems or outlets, such as floor drain plumbing systems, roof drain plumbing systems, and/or a clean-out system.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

We claim:

1. A seal comprising:
   a seal body having an annular portion, a mounting flange and a disk portion, said annular portion defining an outer sealing surface and an inner sealing surface, said mounting flange integrally attached to a first end of said annular portion, said disk portion having a first surface and a second surface, said disk portion integrally attached to a second end of said annular portion, wherein said inner sealing surface and said second surface define a cavity; a handle extending from said first surface of said disk portion in a direction opposite said cavity, wherein a first ring-shaped recess is formed on said first surface of said disk portion and wherein a first pair of spaced annular-shaped ribs depend from said second surface, and wherein a second ring-shaped recess is formed between said first pair of spaced annular-shaped ribs, said first recess being coaxial with and axially spaced directly above said second recess;

a second pair of spaced annular-shaped ribs depending from said second surface, a third ring-shaped recess defined between said second pair of spaced annular-shaped ribs, an inner ring portion defined on said disk portion between said second recess and said third recess, wherein said handle is positioned on said inner ring-portion; and indicia defined on said first surface of said disk portion aligned with a portion of said third ring-shaped recess for indicating where the seal body can be cut to facilitate removal of said disk portion by pulling on said handle.

2. The seal of claim 1, wherein said handle and said disk portion are integrally formed.

3. The seal of claim 1, wherein said body comprises a material selected from a group consisting of an elastomeric material, a polymeric material, and a flexible rubber material.

4. The seal of claim 1, further comprising at least one rib extending from said annular portion, said rib defining a portion of said outer sealing surface, wherein said rib on said outer sealing surface extends in a direction opposite said cavity.

5. The seal of claim 1, further comprising at least one rib extending from said annular portion, said rib defining a portion of said inner sealing surface, wherein said rib on said inner sealing surface extends in a direction toward said cavity.

6. The seal of claim 1, further comprising a plurality of ribs extending from said annular portion, said ribs defining a portion of said outer sealing surface and said inner sealing surface, wherein at least one rib on said outer sealing surface extends in a direction opposite said cavity and wherein at least one rib on said inner sealing surface extends in a direction toward said cavity.

7. A method of installing a seal in a drain comprising the steps of:

a. providing a seal comprising a seal body having an annular portion, a mounting flange and a disk portion said annular portion defining an outer sealing surface and an inner sealing surface, said mounting flange integrally attached to a first end of said annular portion, said disk portion having a first surface and a second surface integrally attached to an opposite end of said annular portion, wherein said inner sealing surface and said second surface define a cavity, a handle extending from said first surface of said disk portion in a direction opposite said cavity, wherein a first ring-shaped recess is formed on said first surface of said disk portion, and wherein a first pair of spaced annular-shaped ribs depend from said second surface, and wherein a second ring-shaped recess is formed between said first pair of spaced annular-shaped ribs, said first recess being coaxial with and axially spaced directly above said second recess, a second pair of spaced annular-shaped ribs depending from said second surface, a third ring-shaped recess defined between said second pair of spaced annular-shaped ribs, an inner ring portion defined on said disk portion between said second recess and said third recess, wherein said handle is positioned on said inner ring portion and indicia defined on said first surface of said disk portion aligned with a portion of said third ring-shaped recess for indicating where the seal body can be cut to facilitate removal of said disk portion by pulling on said handle;

b. inserting said seal into a drain body wherein said handle on said disk portion extends in a first direction;

c. inserting a pipe into said cavity of said seal body; and d. pulling said handle in a direction opposite said cavity until said disk portion separates from said annular portion of said seal body along said first ring-shaped recess.

8. The method of claim 7, further comprising a step of cutting a slit in the indicia after step c.

9. The method of claim 7, further comprising the step of pressurizing said cavity to test for leaks after step c.

10. A seal, comprising:

a seal body having an annular portion, a mounting flange, and a disk portion, said annular portion defining an outer sealing surface and an inner sealing surface, said mounting flange integrally attached to a first end of said annular portion, said disk portion having a first surface and a second surface, said disk portion integrally attached to a second end of said annular portion, wherein said inner sealing surface and said second surface define a cavity;

a plurality of ribs extending from said annular portion, said ribs defining a portion of said outer sealing surface and said inner sealing surface, wherein at least one rib on said outer sealing surface extends in a direction opposite said cavity, and at least one rib on said inner sealing surface extends in a direction toward said cavity;

a handle integrally formed with said disk portion, said handle extending from said first surface of said disk portion in a direction opposite said cavity, wherein a first ring-shaped recess is formed on said first surface of said disk portion and wherein a first pair of spaced annular-shaped ribs depend from said second surface, and wherein a second ring-shaped recess is formed between said first pair of spaced annular-shaped ribs, said first recess being coaxial with and axially spaced directly above said second recess;

a second pair of spaced annular-shaped ribs depending from said second surface;

a third ring-shaped recess defined between said second pair of spaced annular-shaped ribs, and inner ring portion on said disk portion between said second recess and said third recess, wherein said handle is positioned on said inner ring portion; and indicia defined on said first surface of said disk portion aligned with a portion of said third ring-shaped recess for indicating where the seal body can be cut to facilitate removal of said disk portion by pulling on said handle.

* * * * *

UNITED STATES PATENT AND TRADEMARK OFFICE
CERTIFICATE OF CORRECTION

PATENT NO. : 6,739,597 B2
DATED : May 25, 2004
INVENTOR(S) : Nicolia et al.

It is certified that error appears in the above-identified patent and that said Letters Patent is hereby corrected as shown below:

Title page,
Item [74], *Attorney, Agent, or Firm*, "Ziesenhiem" should read -- Ziesenheim --

Column 3,
Line 48, "the disk portion and" should read -- the disk portion 58 and --

Column 6,
Line 49, "and inner ring portion" should read -- an inner ring portion --

Signed and Sealed this

Nineteenth Day of October, 2004

JON W. DUDAS
*Director of the United States Patent and Trademark Office*